(12) United States Patent
Trent (10) Patent No.: US 8,517,109 B2
(45) Date of Patent: *Aug. 27, 2013

(54) FLOATING VESSEL FOR SUPPORTING WELL HEAD SURFACE EQUIPMENT

(75) Inventor: David Trent, Cypress, TX (US)

(73) Assignee: Drilling Technological Innovations, LLC, Houston, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/109,597

(22) Filed: May 17, 2011

(65) Prior Publication Data

US 2012/0292041 A1    Nov. 22, 2012

(51) Int. Cl.
*B63B 35/44* (2006.01)
*E21B 7/128* (2006.01)

(52) U.S. Cl.
USPC .......................................... 166/352; 166/353

(58) Field of Classification Search
USPC .................. 405/224.4, 224.2; 166/352–355, 166/345, 367
See application file for complete search history.

(56) References Cited

U.S. PATENT DOCUMENTS

| 3,187,153 | A |  | 6/1965 | Allardt et al. |
| 4,813,519 | A |  | 3/1989 | Matsubara et al. |
| 6,290,235 | B1 |  | 9/2001 | Albertson |
| 6,554,072 | B1 | * | 4/2003 | Mournian et al. ............ 166/355 |
| 7,329,070 | B1 | * | 2/2008 | Trent et al. ................. 405/224.4 |
| 7,976,247 | B1 | * | 7/2011 | Trent et al. ................. 405/224.4 |
| 2003/0063953 | A1 | * | 4/2003 | Beynet et al. .............. 405/224.4 |
| 2011/0170955 | A1 | * | 7/2011 | Koos et al. ................. 405/224.4 |
| 2012/0292042 | A1 | * | 11/2012 | Trent ............................ 166/355 |

* cited by examiner

*Primary Examiner* — Matthew Buck
*Assistant Examiner* — James Sayre
(74) *Attorney, Agent, or Firm* — Buskop Law Group, PC; Wendy Buskop (57) ABSTRACT

One or more embodiments of a floating vessel for supporting well head surface equipment that has a deck operatively disposed on the floating vessel. The floating vessel can include a ram tensioner system positioned between the well head surface equipment and the deck. The ram tensioner system can include push up ram style tensioner system with a deck mountable frame having an upper portion and a lower portion connected by a plurality of cylinder sleeves and at least one guide post sleeve.

17 Claims, 6 Drawing Sheets

FIGURE 5

FLOATING VESSEL FOR SUPPORTING WELL HEAD SURFACE EQUIPMENT

FIELD

The present embodiments generally relate to a floating vessel for supporting well head surface equipment.

BACKGROUND

A need exists for a platform, such as a tension leg platform, that uses a tensioner system that is reliable, easy to operate, easily maintained, and has the ability to be remotely monitored.

A need exists for a platform, such as a tension leg platform, that uses a tensioner system that replaces cumbersome direct acting cylinder accumulator style tensioners often found on a tension leg platform.

A need exists for a tension leg platform with a push up style or short stroke ram style tensioner, wherein the tensioner is simple to operate and maintain, and has a tensioner system that is reliable and allows for a smaller crew to service.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a floating vessel for supporting well head surface equipment.

The floating vessel can include a deck on top of a hull. A ram tensioner system can be positioned between the well head surface equipment and the deck.

One or more embodiments of the ram tensioning system can have a reduced complexity and is less cumbersome to install on the deck when compared to the installation of a cassette style tensioner systems or "ten-dome" style tensioner systems that contain direct acting cylinder accumulator assemblies.

One or more embodiments of the ram tensioning system can provide easy maintenance as individual cylinders can be individually replaced without replacing all the cylinders thereby enabling continuation of work.

One or more embodiments of the ram tensioning system can provide individually removable seal glands to provide maintenance without removing the entire device.

One or more embodiments of the ram tensioning system can provide easy maintenance because each of the seal glands can be separately replaced if defective, without having to replace all of the seal glands at once or having to pull the entire unit out of service for repair.

In one or more embodiments, each seal gland can be in communication with a hydraulic power unit that can have a filtration system. The filtration can filter fluid to extend the seal life. The hydraulic power unit can provide fluid to the seal glands to help lubricate and clean the seals of the seal gland.

One or more embodiments of the ram tensioning system, the system can be remotely operated. For example, in the case of a severe storm the present tensioning system can be controlled from a remote location, which eliminates the need for personnel to be exposed to hazardous conditions.

One or more embodiments of the ram tensioning system can be a push-up style and can include a deck mountable frame.

The deck mountable frame can have an upper portion and a lower portion connected by a plurality of cylinder sleeves and at least one guide post sleeve.

The upper portion can have a plurality of upper cylinder holes, an upper portion center hole for allowing a riser to pass therethrough, and at least one upper guide post hole for allowing a guide post to pass therethrough.

The lower portion can be connected to a hull or deck of a vessel. In an embodiment, the lower portion can rest on the deck.

Additionally, the lower portion can have at least one guide post hole aligned with the upper guide post hole. A lower portion center hole can be aligned with the upper portion center hole. Accordingly, a riser can pass through both center holes.

The lower portion can have a plurality of lower cylinder holes that can be aligned with the plurality of upper cylinder holes.

A plurality of cylinder sleeves can extend from the upper portion to the lower portion and connect the two portions together. Each cylinder hole can have one or more cylindrical sleeves concentrically disposed therein. The cylindrical sleeves can provide a rigid connection between the lower portion and the upper portion.

A plurality of individually replaceable modular cylinders can be disposed within the cylindrical sleeves.

At least one guide post sleeve can be disposed between the upper portion and the lower portion. The guide post sleeve can be concentric to one of the guide post holes.

An individually replaceable modular cylinder can be at least partially contained within an associated cylinder sleeve. For example, an individually replaceable modular cylinder can be at least 30 percent contained within an associated cylinder sleeve. One or more of the replaceable modular cylinders can be a dual pressure cylinder. For example, the cylinders can be double acting cylinders with a low pressure chamber and high pressure chamber. The cylinders can also be self contained and pneumatic. The dual pressure cylinders can be any dual pressure cylinders.

A plurality of individually removable seal glands can be disposed adjacent one or more of the individually replaceable modular cylinders. In one or more embodiments, one or more of the individually replaceable modular cylinders can contain a seal gland.

A plurality of slidable rods can slide within each of the individually removable seal glands and then into one of the individually replaceable modular cylinders. In an embodiment, the slidable rods can be hollow.

The individually removable seal gland can be configured to be replaced without requiring the removal of the individually replaceable modular cylinders and the cylinder sleeves from the vessel.

A tension deck, which can be movable, can be connected to each of the plurality of rods, wherein the tension deck can be connected to the rods opposite the individually replaceable modular cylinders.

At least one guide post can be mounted to the tension deck, for slidably or rotatably engaging within each guide post sleeve.

At least one hydraulic power unit can be connected to each individually replaceable modular cylinder to lubricate seals within the removable seal glands.

A tension ring can be supported within the tension deck, and the tension ring can be used for providing tension to the riser. The tension ring moves when the slidable rods simultaneously push against the tension deck to provide tension from the tension deck to the riser.

In an embodiment, the guide post sleeve can contain a guide post housing extending from the lower portion. The guide post sleeve can be concentric to the guide post hole.

In an embodiment, the upper portion can be made from tubular members, steel plates, or metal beams.

In an embodiment, the upper cylinder holes and lower cylinder holes can have a diameter ranging from about 6 inches to about 36 inches.

In an embodiment, the upper portion and lower portion center holes can have a diameter ranging from about 36 inches to about 100 inches.

In an embodiment, the guide post holes can have a diameter ranging from about 6 inches to about 36 inches.

In an embodiment, the upper portion and the lower portion can have from about 2 cylinder holes to about 12 cylinder holes, an identical number of cylinder sleeves, and individually replaceable modular cylinders and slidable rods.

In an embodiment, the upper portion and the lower portion can have from about 2 guide post holes to about 12 guide post holes and an identical number of guide posts.

In an embodiment, each cylinder sleeve can be made from metal, or metal composites. In an embodiment, each cylinder sleeve can have a length from about 1 foot to about 35 feet.

In an embodiment, each individually replaceable modular cylinder can be hydraulic.

In an embodiment, each seal gland can include a pair of primary and secondary high pressure seals in tandem with a pair of primary and secondary low pressure seals to seal against each rod in the cylinder.

In an embodiment, the tension deck can be a plate, a welded frame, or welded tubular members forming a frame for containing the tension ring.

In an embodiment, each seal gland can be entirely contained within each cylinder.

In an embodiment, each seal gland can be individually and separately removable without requiring removal of all the seal glands of the system simultaneously.

Figures 1A, 1B:
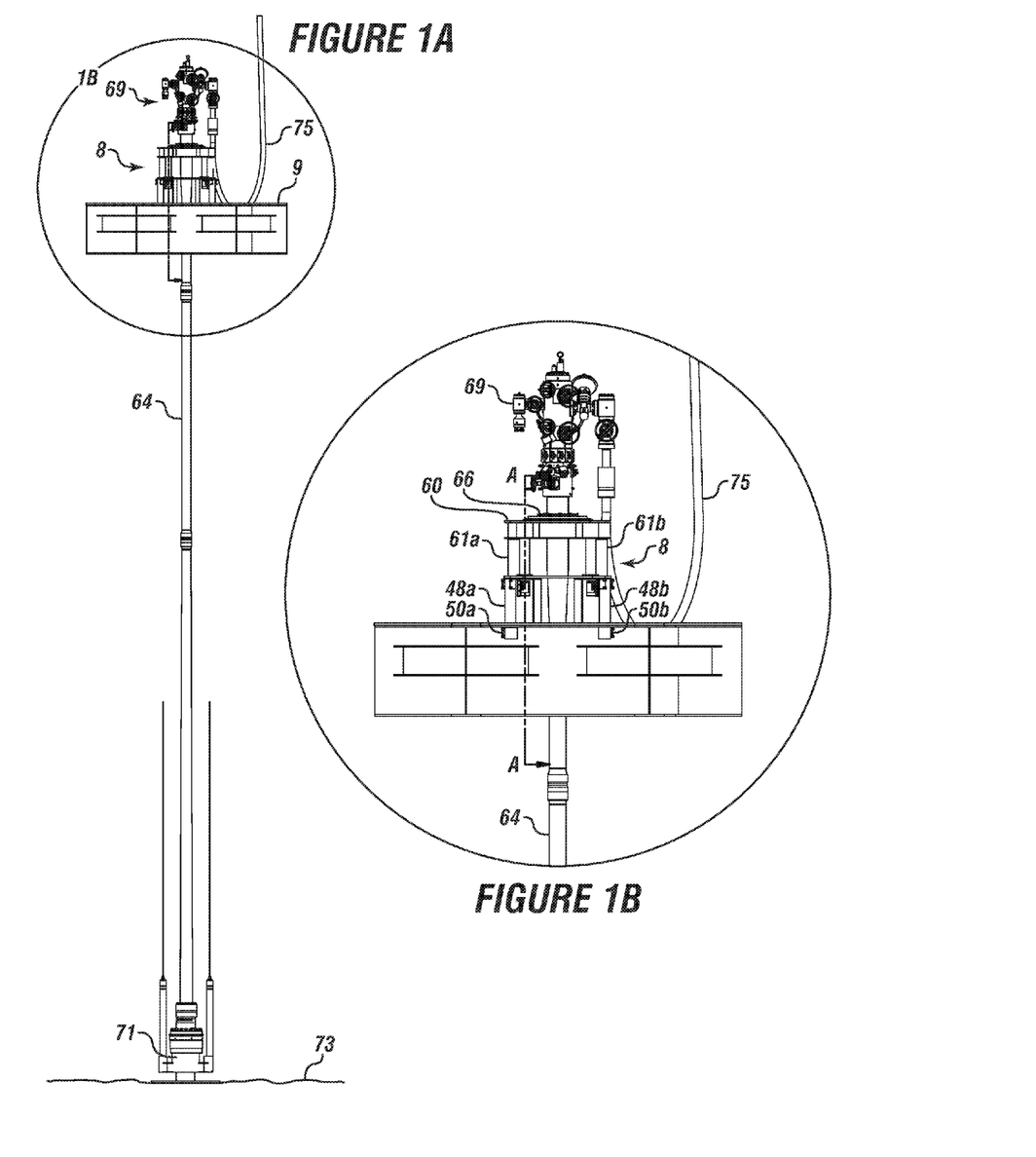
FIG. 1A depicts a schematic of a riser connected to a ram tensioning system according to one or more embodiments.
FIG. 1B depicts a detailed schematic view of the ram tensioning system of FIG. 1 according to one or more embodiments.

Turning now to the Figures, FIG. 1A depicts a schematic of a riser connected to a ram tensioning system 8 according to one or more embodiments. FIG. 1B depicts a detailed schematic view of the ram tensioning system of FIG. 1 according to one or more embodiments.

Referring to FIGS. 1A and 1B, the ram tensioning system 8 can be disposed between well head surface equipment 69 and a deck 9. The well head surface equipment 69 can be a blow out preventer, a Christmas tree, other equipment, or combinations thereof. The ram tensioning system 8 can be connected to a riser 64. The riser 64 can be any riser configured for subsea use. The riser 64 can communicate with the well head surface equipment 69 and a subsea well 71. The subsea well 71 can be formed through a sea floor 73.

An umbilical or conduit 75 can be in fluid communication with the well head surface equipment 69.

The ram tensioning system 8 can include one or more tension rings 66, one or more guide posts 61a and 61b, one or more guide post sleeves 48a and 48b, a tension deck 60, and one or more guide post housings 50a and 50b.

The tension ring 66 can be connected to the tension deck 60. The guide posts 61a and 61b can be disposed within the guide post sleeves 48a and 48b. The guide post 61a and 61b can be at least partially disposed within the guide post housings 50a and 50b.

Figure 2:
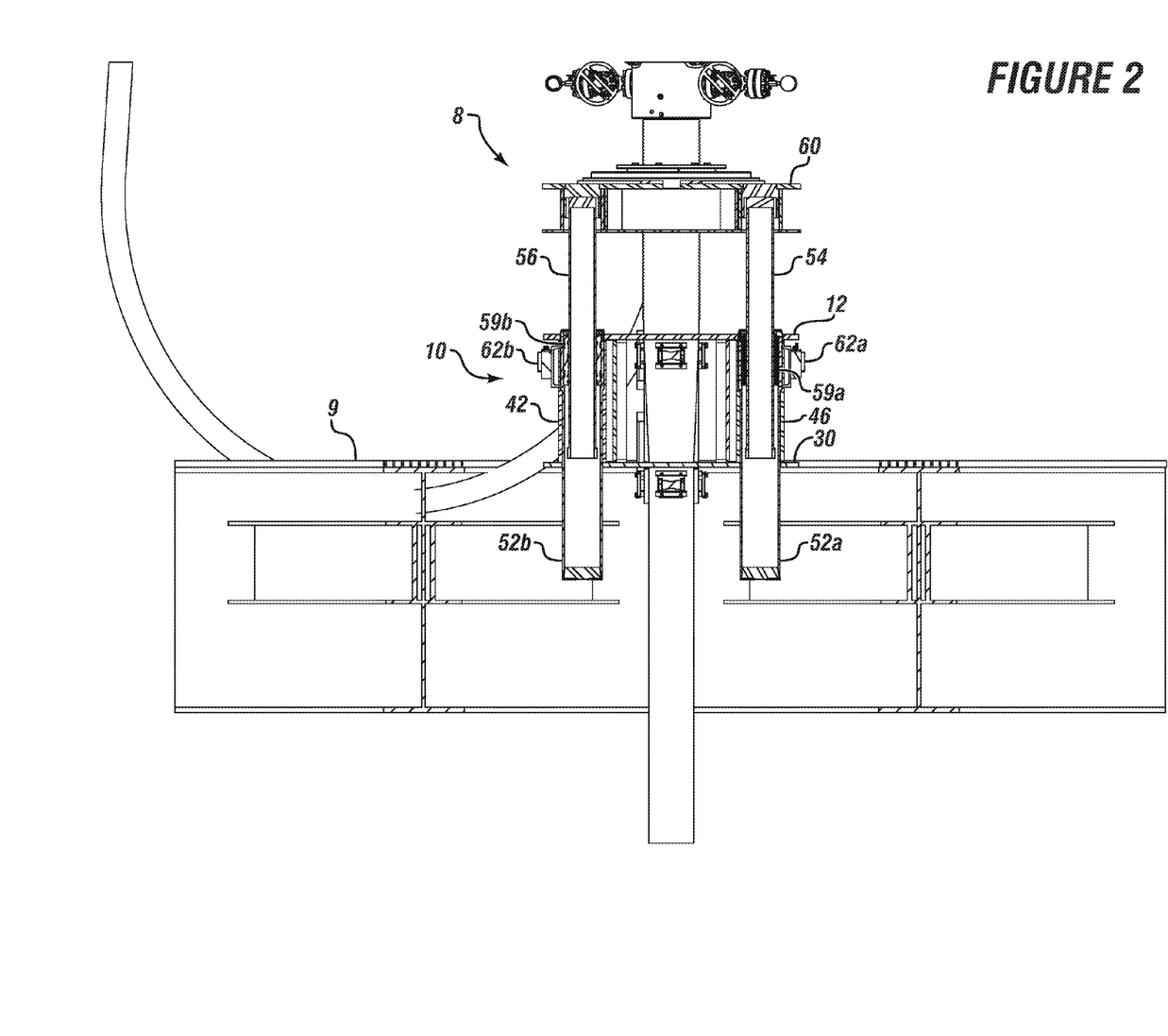
FIG. 2 depicts a cross sectional view of the ram tensioning system of FIG. 1 cut along line A-A.

FIG. 2 depicts a cross sectional view of the ram tensioning system of FIG. 1 cut along line A-A.

The ram tensioning system 8 can also include one or more slidable rods 54 and 56, one or more deck mountable frames 10, one or more individually removable seal glands 59a and 59b, and one or more cylinders 52a and 52b.

The tension deck 60 can be connected to the slidable rods 54 and 56. The individually removable seal glands 59a and 59b can be independently disposed about the slidable rods 54 and 56. For example, a first individually removable seal gland 59a can be disposed about a first slidable rod 54 and a second individually removable seal gland 59b can be disposed about the second slidable rod 56.

The slidable rods 54 and 56 can be at least partially disposed within the cylinders 52a and 52b. The individually removable seal glands 59a and 59b can be secured within the cylinders 52a and 52b, and the slidable rods 54 and 56 can move relative to the individually removable seal glands 59a and 59b. The cylinder sleeves 42 and 46 can house the cylinders 52a and 52b. The cylinders 52a and 52b can be pressured up, and the cylinders 52a and 52b and the rods 54 and 56 can act like a cushion or spring on the tension deck 60.

The deck mountable frame 10 can include an upper portion 12 and a lower portion 30.

The lower portion 30 can be connected to the deck 9. The upper portion 12 can be secured to a portion of the lower portion 30. The upper portion 12 can be distal from the deck 9.

One or more hydraulic power units 62a and 62b can be in fluid communication with the individually removable seal glands 59a and 59b. The hydraulic power units 62a and 62b can be any hydraulic power unit.

Figure 3:
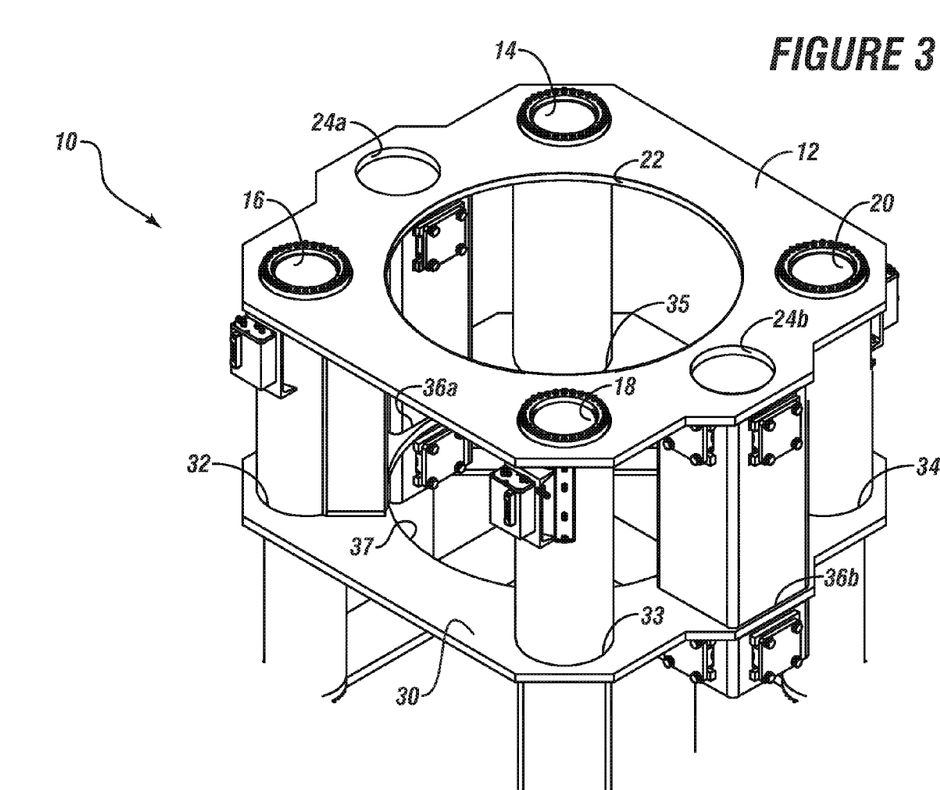
FIG. 3 depicts a detailed view of a deck mountable frame of the ram tensioning system of FIG. 1 according to one or more embodiments.

FIG. 3 depicts a detailed view of a deck mountable frame of the ram tensioning system of FIG. 1 according to one or more embodiments. To ensure clarity and brevity certain previously described components have not be labeled.

The deck mountable frame 10 can include a plurality of upper cylinder holes 14, 16, 18 and 20, an upper portion center hole 22, and two upper guide post holes 24a and 24b on the upper portion 12.

The lower portion 30 can include a plurality of lower cylinder holes 32, 33, 34, and 35. The lower cylinder holes 32, 33, 34, and 35 can be aligned with the upper cylinder holes 14, 16, 18 and 20.

The lower portion 30 can also include one or more lower guide post holes 36a and 36b. The lower guide post holes 36a and 36b can be aligned with the upper guide post holes 24a and 24b.

A lower portion center hole 37, in the lower portion 30, can be aligned with the upper portion center hole 22. The center holes 22 and 37 can be configured to allow a riser to pass therethrough.

Figure 4A:
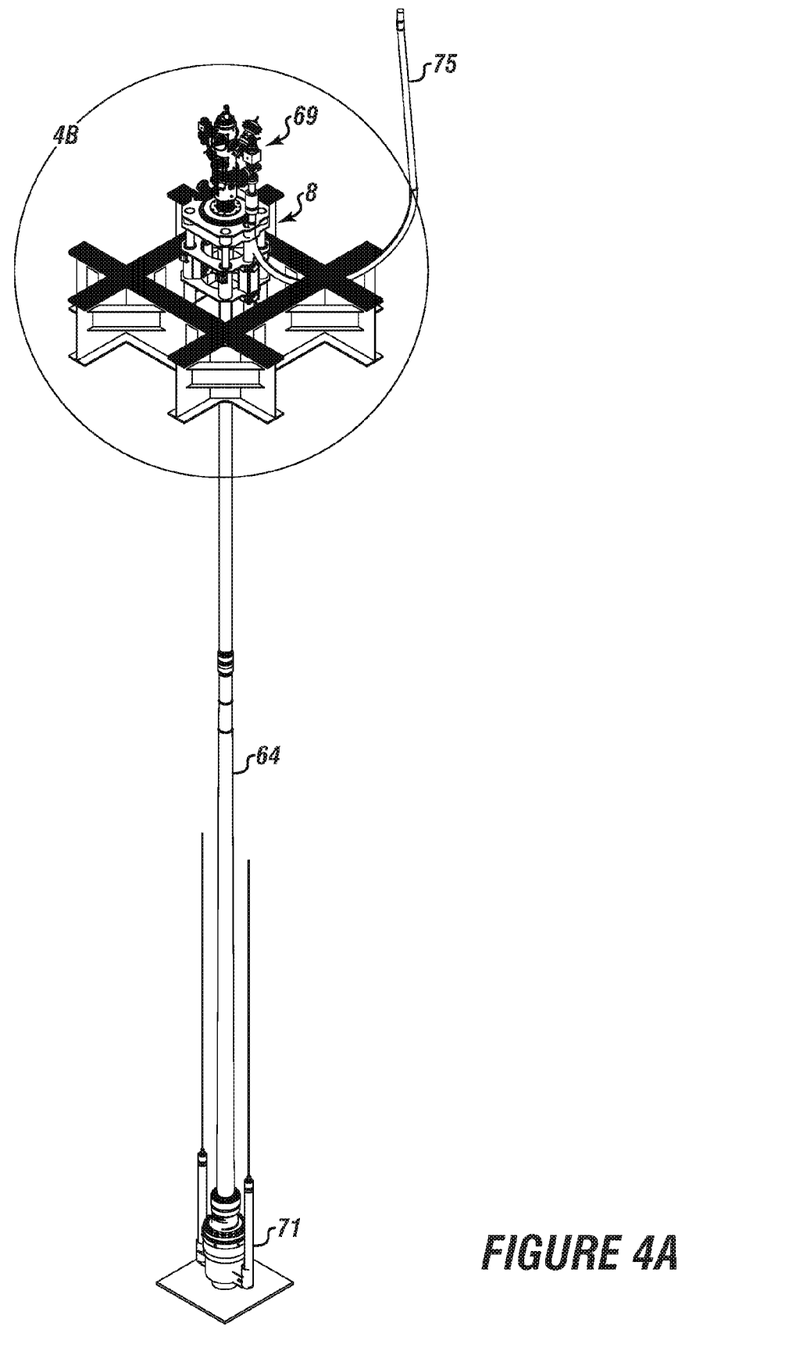
FIG. 4A depicts a schematic view of a ram tensioning system according to one or more embodiments.
Figure 4B:
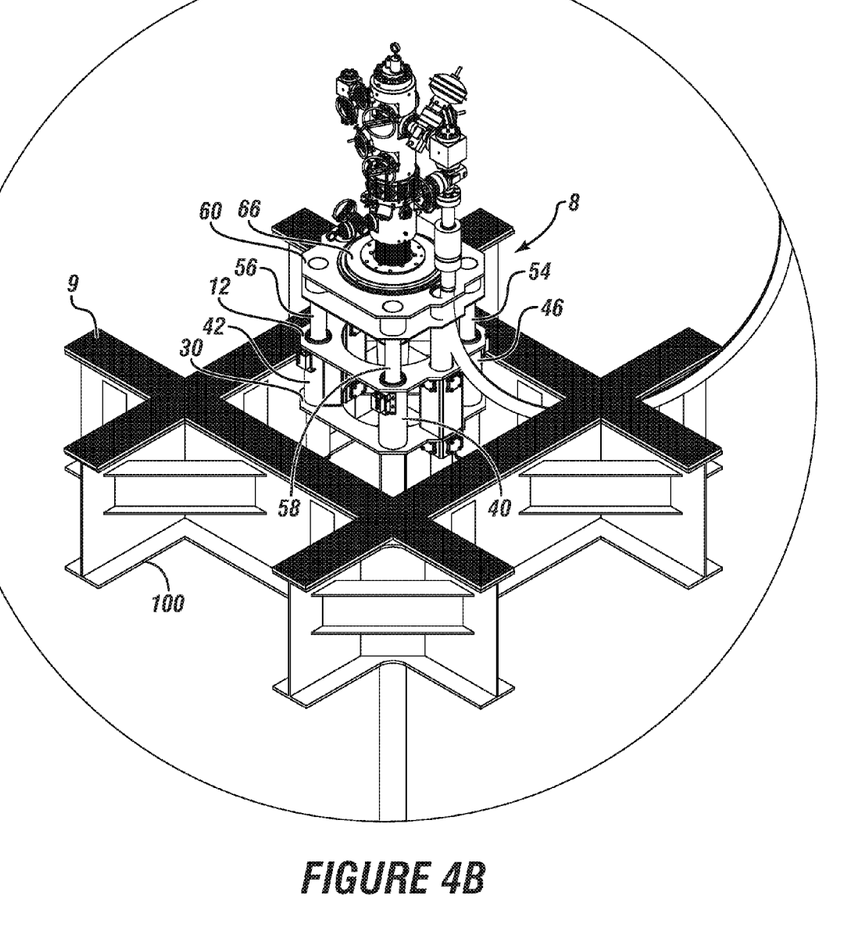
FIG. 4B depicts a detail view of a portion of the ram tensioning system according to one or more embodiments

FIG. 4A depicts a schematic view of the ram tensioning system 8 according to one or more embodiments. FIG. 4B depicts a detail view of a portion of the ram tensioning system 8 according to one or more embodiments. To ensure clarity and brevity certain previously described components have not be labeled.

The ram tensioning system 8 is shown connected to the riser 64. The riser 64 can communicate with the well head surface equipment 69 and a subsea well 71. The umbilical or conduit is also shown.

In these Figures, the slidable rods 54, 56 and 58 can be at least partially disposed between the upper portion 12 and the lower portion 30. One or more guidepost sleeves can be disposed between the upper portion 12 and the lower portion 30.

Cylinder sleeves 40, 42, and 46 can contain cylinders, which are not show in this Figure. The slidable rods 54, 56 and 58 can have the tension deck 60 disposed thereon. The slidable rods 54, 56, and 58 can be at least partially disposed within the cylinders. The slidable rods 54, 56, and 58 can be held within the cylinders by the seal glands.

The tension ring 66 can be operatively engaged with the tension deck 60.

Figure 5:
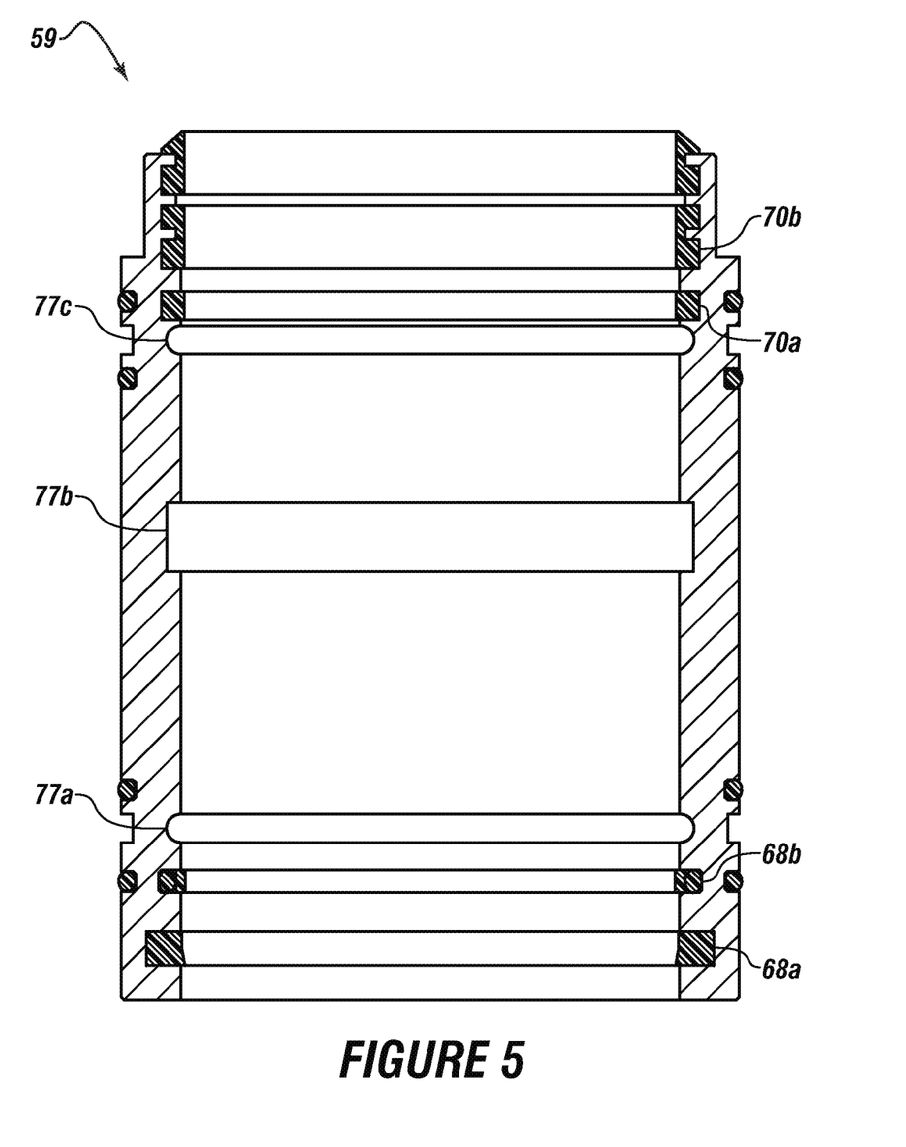
FIG. 5 depicts a seal gland of the ram tensioning system of FIG. 4A according to one or more embodiments.

The ram tensioning system 8 can be at least partially connected to a deck 9 of a vessel 100. The vessel 100 can be a semisubmersible floating vessel, a ship, a tension leg platform, a deep draft partially submersible and buoyant floating vessel, or a similar floating vessel FIG. 5 depicts an individually removable seal gland of the ram tensioning system of FIG. 4A according to one or more embodiments.

The individually removable seal gland 59, which can be similar to any individually removable seal glands described herein, can include one or more low pressure seals 70a and 70b, and one or more high pressure seals 68a and 68b. The seals can be any seal, such as an o-ring. The seals can be made from any material, such as elastomeric material.

A first fluid channel 77a can be located adjacent the first high pressure seal 68b. A second fluid channel 77b can be located in a portion of the individually removable seal gland 59 between the high pressure seals 68a and 68b and the low pressure seals 70a and 70b. A third fluid channel 77c can be located adjacent to the first low pressure seal 70a. The fluid channels 77a, 77b, and 77c can be configured to aid in the circulation of fluid through the seals 68a, 68b, 70a and 70b to keep the seals clean and lubricated.

In operation, the ram tensioning system can be disposed on a deck of a vessel. The seal glands can be located within the cylinders. The slidable rods can have the tension deck located thereon at one end and can be at least partially located within the cylinders. The cylinders can have seal glands disposed therein. The seal glands can be configured to allow the slidable rods to pass at least partially therethrough. Accordingly, the slidable rods can be moved within the cylinders to adjust for movement of the tension deck. Accordingly, the cylinders and slidable rods can provide a cushion to the tension deck to dampen vibrations and reduce forces felt by the tension deck.

While these embodiments have been described with emphasis on the embodiments, it should be understood that within the scope of the appended claims, the embodiments might be practiced other than as specifically described herein.

What is claimed is:

1. A floating vessel for supporting well head surface equipment comprising:
   a. a deck operatively disposed on the floating vessel;
   b. a deck mountable frame comprising:
      (i) an upper portion comprising:
         (a) a plurality of upper cylinder holes;
         (b) an upper portion center hole for allowing a riser to pass therethrough; and
         (c) at least one upper guide post hole;
      (ii) a lower portion for connecting to the deck of the floating vessel, wherein the lower portion comprises:
         (a) a plurality of lower cylinder holes aligned with the plurality of upper cylinder holes;
         (b) at least one guide post hole disposed in alignment with the upper guide post holes;
         (c) a lower portion center hole aligned with the upper portion center hole for allowing the riser to pass therethrough;
         (d) a plurality of cylinder sleeves extending from the upper portion to the lower portion, wherein each of cylindrical sleeves are concentric to the cylinder holes providing a rigid connection between the lower portion and the upper portion; and
         (e) at least one guide post sleeve disposed between the upper portion and the lower portion, wherein each guide post sleeve is concentric to one of the guide post holes;
   c. a plurality of individually replaceable modular cylinders, wherein each individually replaceable modular cylinder is at least partially disposed within the cylinder sleeve;
   d. a plurality of individually removable seal glands disposed adjacent each individually replaceable modular cylinder, wherein each individually removable seal gland is contained within each individually replaceable modular cylinder;
   e. a plurality of slidable rods, wherein each slidable rod slides within one of the individually removable seal glands and then into one of the individually replaceable modular cylinders, and wherein each individually removable seal gland is replaced without removing all of the individually replaceable modular cylinders and all of the cylinder sleeves from the floating vessel;
   f. a tension deck connected to each of the plurality of slidable rods, wherein the tension deck is connected to the slidable rods opposite the individually replaceable modular cylinders;
   g. at least one guide post mounted to the tension deck, for slidably or rotatably engaging within each guide post sleeve;
   h. at least one hydraulic power unit connected to each individually replaceable modular cylinder to lubricate seals within the individually removable seal glands; and
   i. a tension ring supported within the tension deck for providing tension to the riser.

2. The floating vessel of claim 1, wherein the guide post sleeve comprises at least one guide post housing extending from the lower portion, wherein the guide post sleeve is concentric to the guide post hole.

3. The floating vessel of claim 1, wherein the upper portion comprises tubular members, steel plates, or metal beams.

4. The floating vessel of claim 1, wherein the plurality of upper cylinder holes and lower cylinder holes have a diameter ranging from 6 inches to 36 inches.

5. The floating vessel of claim 1, wherein the upper portion and the lower portion center holes have a diameter ranging from 36 inches to 100 inches.

6. The floating vessel of claim 1, wherein the guide post holes have a diameter ranging from 6 inches to 36 inches.

7. The floating vessel of claim 1, wherein the upper portion and the lower portion have an identical number of cylinder holes, cylinder sleeves, individually replaceable modular cylinders and slidable rods.

8. The floating vessel of claim 1, wherein the upper portion and the lower portion have an identical number of guide post holes and guide posts.

9. The floating vessel of claim 1, wherein each cylinder sleeve is made from metal or metal composites.

10. The floating vessel of claim 1, wherein each cylinder sleeve has a length from 1 foot to 35 feet in length.

11. The floating vessel of claim 1, wherein each individually replaceable modular cylinder is hydraulic or pneumatic.

12. The floating vessel of claim 1, wherein each individually removable seal gland comprises a pair of primary and secondary high pressure seals in tandem with a pair of primary and secondary low pressure seals to seal against each slidable rod in the individually replaceable modular cylinder.

13. The floating vessel of claim 1, wherein each slidable rod is hollow.

14. The floating vessel of claim 1, wherein the tension deck is a plate, a welded frame, or welded tubular members forming a frame for containing the tension ring.

15. The floating vessel of claim 1, wherein each individually removable seal gland is entirely contained within each individually replaceable modular cylinder.

16. The floating vessel of claim 15, wherein each individually removable seal gland is individually and separately removable without requiring removal of all the individually removable seal glands of the system simultaneously.

17. The floating vessel of claim 1, wherein the floating vessel is a semi-submersible floating vessel, a ship, a tension leg platform, a deep draft partially submersible and buoyant floating vessel, or similar floating vessel.

\* \* \* \* \*